(12) United States Patent
Hilbig et al.

(10) Patent No.: US 8,906,137 B2
(45) Date of Patent: Dec. 9, 2014

(54) ARRANGEMENT AND METHOD FOR SEPARATING OXYGEN

(75) Inventors: Rainer Hilbig, Aachen (DE); Mareike Klee, Straelen (DE); Wilhelmus Cornelis Keur, Weert (NL)

(73) Assignee: Koninklijke Philips N.V., Eindhoven (NL)

( * ) Notice: Subject to any disclaimer, the term of this patent is extended or adjusted under 35 U.S.C. 154(b) by 43 days.

(21) Appl. No.: 13/879,066

(22) PCT Filed: Oct. 18, 2011

(86) PCT No.: PCT/IB2011/054622
§ 371 (c)(1),
(2), (4) Date: Apr. 12, 2013

(87) PCT Pub. No.: WO2012/052915
PCT Pub. Date: Apr. 26, 2012

(65) Prior Publication Data
US 2013/0213227 A1    Aug. 22, 2013

(30) Foreign Application Priority Data

Oct. 22, 2010 (EP) .................................... 10188478

(51) Int. Cl.
*B01D 53/22* (2006.01)
*C01B 13/02* (2006.01)
*B01D 63/08* (2006.01)
*B01D 63/16* (2006.01)
*B01D 69/10* (2006.01)

(52) U.S. Cl.
CPC ........ *B01D 53/229* (2013.01); *B01D 2257/102* (2013.01); *B01D 53/22* (2013.01); *C01B 13/0255* (2013.01); *B01D 2311/06* (2013.01); *B01D 2259/818* (2013.01); *B01D 63/087* (2013.01); *B01D 2256/12* (2013.01); *B01D 2313/345* (2013.01); *B01D 63/16* (2013.01); *B01D 2313/26* (2013.01); *B01D 69/10* (2013.01); *B01D 2259/4533* (2013.01); *B01D 2313/22* (2013.01); *B01D 2315/02* (2013.01)
USPC ................... 95/54; 95/43; 95/45; 96/4; 96/7; 96/9; 96/15

(58) Field of Classification Search
USPC ........................... 95/43, 45, 54; 96/4, 7, 9, 15
See application file for complete search history.

(56) References Cited

U.S. PATENT DOCUMENTS 5,162,101 A * 11/1992 Cosentino et al. .............. 422/46
5,296,110 A    3/1994 Tabatabaie-Raissi (Continued)

FOREIGN PATENT DOCUMENTS

JP    2005270849    10/2005

OTHER PUBLICATIONS

J.W. Staples et al., "The SNS Four-Phase Lebt Chopper", Proceedings of the 1999 Particle Accelerator Conference, New York, 1999, pp. 1961-1963.

*Primary Examiner* — Jason M Greene
*Assistant Examiner* — Anthony Shumate (57) ABSTRACT

The present invention relates to an arrangement for separating oxygen from an oxygen containing gas. It comprises a membrane unit (12), and an electrode unit (24). The membrane unit (12) comprises a porous substrate (20), a dense membrane (14) and at least one electrode (18), wherein the porous substrate (20) is directed towards the electrode unit (24), and wherein the electrode unit (24) comprises at least one electrode comprising at least one rotatable electrode wing (26) being at least partially electrically conductive. An arrangement according to the invention allows to separate oxygen with improved efficiency and improved convenience with respect to maintenance and noise.

13 Claims, 3 Drawing Sheets

(56) References Cited

U.S. PATENT DOCUMENTS

| | | |
|---|---|---|
| 5,753,007 A | 5/1998 | Russek et al. |
| 7,166,148 B2 * | 1/2007 | Lyons et al. .................. 95/54 |
| 7,179,322 B2 * | 2/2007 | Lyons et al. .................. 95/47 |
| 2002/0100836 A1 * | 8/2002 | Hunt .............................. 244/50 |
| 2005/0061663 A1 | 3/2005 | Chen et al. |
| 2005/0284295 A1 | 12/2005 | Ohta et al. |
| 2010/0307974 A1 * | 12/2010 | Pettinger et al. .............. 210/650 |
| 2011/0007161 A1 * | 1/2011 | Batchko et al. ............... 348/144 |
| 2014/0048409 A1 * | 2/2014 | Hilbig et al. .................. 204/156 |

* cited by examiner

ARRANGEMENT AND METHOD FOR SEPARATING OXYGEN

FIELD OF THE INVENTION

The invention relates to the field of oxygen separation. In particular, the invention relates to the field of oxygen separation for therapeutic applications using plasma generation.

BACKGROUND OF THE INVENTION

Oxygen therapy is the administration of oxygen as a therapeutic modality. It is widely used for a variety of purposes in both chronic and acute patient care as it is essential for cell metabolism, and in turn, tissue oxygenation is essential for all physiological functions. Oxygen therapy can be used to benefit the patient by increasing the supply of oxygen to the lungs and thereby increasing the availability of oxygen to the body tissues, especially when the patient is suffering from hypoxia and/or hypoxaemia. Oxygen therapy may be used both in applications in hospital or in home care. The main home care application of oxygen therapy is for patients having severe chronic obstructive pulmonary disease (COPD).

Oxygen may be administered in a number of ways. A preferable way of oxygen administration is given by a so called on demand generation of oxygen, or an in situ generation, respectively. Referring to this, commercial solutions, so-called oxygen concentrators, or separators, respectively, are widely known. These oxygen concentrators mostly separate oxygen from an oxygen containing gas, so that the oxygen is provided on demand, i.e. directly before use. Most known oxygen concentrators require a compressor to compress the oxygen containing gas. Furthermore, oxygen, preferably pure oxygen, has to be generated. Therefore, most known oxygen concentrators comprise a membrane, in particular an organic membrane, a molecular sieve, or the like, to separate oxygen from the oxygen containing gas.

One of the major drawbacks of the known oxygen concentrators is given by the high costs which are generated with respect to producing and operating said devices. Furthermore, undesired constituents of the oxygen containing gas, mostly nitrogen, are adsorbed on the membrane thereby causing the requirement of a so-called swing process by which the adsorbed gas is desorbed from the membrane. During that desorption step, a separation of oxygen is not possible, because of which two membranes are desired to work in an anticyclical manner which further increases the costs. Apart from that, the compressors are mostly noisy leading to a decreased convenience especially when the oxygen concentrator is used over night. Furthermore, the generated oxygen is non-sterile, because of which a further measure of disinfection is often desired or necessary.

Traditional oxygen concentrators are bulky, heavy and require ongoing maintenance by patients and home care providers. Such devices produce noise and heat. Furthermore, a reduction of costs (a compressor unit comes up with a significant contribution), such as recurrent purchase costs and servicing costs is desirable.

SUMMARY OF THE INVENTION

It is an object of the invention to provide an arrangement and a method for separating oxygen which overcomes at least one of the limitations as set forth above.

It is a further object of the invention to provide an arrangement and a method for separating oxygen which is cost-saving, and which improves convenience with respect to maintenance and noise.

This object is achieved by an arrangement for separating oxygen from an oxygen containing gas, comprising: a membrane unit, and an electrode unit, wherein the membrane unit comprises a porous substrate, a dense membrane and at least one electrode, wherein the porous substrate is directed towards the electrode unit, and wherein the electrode unit comprises at least one electrode comprising at least one rotatable electrode wing being at least partially electrically conductive.

The present invention provides an arrangement which is well suited for separating oxygen from an oxygen containing gas by the use of plasma generation.

The present invention is based on the unexpected finding that a combination of heating and compressing an oxygen containing gas by use of a plasma together with separating the oxygen from the oxygen containing gas by a dense membrane like particularly an inorganic membrane leads to surprising and very beneficial synergistic effects.

By generating a plasma, the oxygen containing gas is compressed and heated in one step. This leads to the advantage that no separated devices for heating and pressurizing the oxygen containing gas or the membrane as such are required. Contrary thereto, the gas has a sufficiently high temperature to heat the membrane, thereby enabling a sufficiently high oxygen flow through said membrane. Thereby, the effect of the compressed oxygen containing gas having an elevated temperature by compressing it by use of a plasma, is very well applicable especially in combination with an inorganic membrane.

Furthermore, the arrangement according to the invention works with a reduction of noise leading to a considerable increase in convenience, especially in home care applications. The convenience is even more improved by the fact that by providing electrodes like stated above for generating a plasma for heating and compressing the oxygen containing gas, the arrangement according to the invention has reduced size and weight which is particular advantageous for home care applications.

Additionally, operation of an arrangement according to the invention allows oxygen to be separated with lower costs due to the fact that the arrangement as such may be designed much cheaper than conventional oxygen separators known in the art, and furthermore, the energy efficiency is improved compared to the methods known from the state of the art.

A further advantage of the arrangement according to the invention is the generation of sterile oxygen. Additional disinfection or sterilization steps are not necessary. According to the invention, an on demand generation of sterile oxygen is provided.

Furthermore, by providing a membrane unit with an electrode, the substrate of which is directed towards the electrode unit, several beneficial effects may be achieved.

By providing a membrane unit comprising an electrode in combination with an electrode unit comprising a rotatable electrode wing, a close coupling of the electrode unit and the membrane unit may be achieved. According to the invention it is enabled to generate the plasma inside the pores of the substrate of the membrane unit. This allows realizing very efficient separation conditions.

Additionally, the close coupling of the electrode unit and the membrane unit allows to reduce unwanted thermal losses. In detail, the plasma is used not only to compress the oxygen containing gas, but also to heat the latter to in turn heat the membrane to its operation temperature. Therefore, the oxygen containing gas should preferably be heated to a temperature which lies above said operation temperature of the membrane. Due to the close coupling of the electrode unit and the membrane unit, the gas may at least partially be heated in the membrane unit as such and thus in direct contact to the membrane, resulting in no or only minor losses of thermal energy.

Additionally, the provision of temperature resistant valves for generating an overpressure on the feed side of the membrane to force the gas to flow through the membrane may be omitted. This allows the arrangement according to the invention to be formed in an easy and cost-saving manner.

Due to the combination of the electrode unit comprising a rotatable electrode wing and the membrane unit comprising a further electrode, the arrangement according to the invention may be formed very compact. It is thus well suitable for home care applications and especially for portable devices for separating oxygen.

In the following, the formed gas is defined as oxygen. However, even though high purities of up to 100% of oxygen may be formed using an arrangement according to the invention, the formed oxygen may comprise some impurities without leaving the invention as such. Consequently, the term oxygen comprises gas mixtures in which oxygen is the main constituent.

An arrangement according to the invention thus provides an increase with respect to cost, price, servicing and noise.

In a preferred embodiment of the present invention, the pores of the porous substrate are formed of continuous channels. This allows igniting and maintaining the plasma in direct vicinity to the membrane. This embodiment thus realizes a close contact of the heated and pressurized oxygen containing gas to the membrane, which is advantageous with respect to heating the membrane as well as to pressure being provided for forcing oxygen to flow through the membrane. According to the above, the arrangement according to the invention may be operated very effective.

In a further preferred embodiment of the present invention, the pores of the porous substrate have a diameter of $\geq 0.02$ mm. This allows a suitable amount of oxygen comprising gas to be guided into the pores, thereby allowing an efficient plasma to be formed. In other words, these dimensions improve the efficiency of the arrangement according to the invention.

In a further preferred embodiment of the present invention, the electrode is formed as an electrically conductive layer being provided inside the pores of the porous substrate. This is an especially preferred arrangement for generating a plasma between the electrodes. In detail, due to the fact that the porous substrate is directed towards the rotatable electrode, the plasma may be generated directly inside the pores in an especially effective way. Additionally, this allows designing the pores in dependence of the characteristics of the plasma to be formed. Consequently, the conditions at which the arrangement according to the invention may be operated may be well adjusted.

In a further preferred embodiment of the present invention, the membrane is based on a material having a perovskite or fluorite crystal structure. It is especially preferred, that the membrane is based on a perovskite, the perovskite being chosen from the group comprising $Sr_{1-y}Ba_yCo_{1-x}FexO_{3-z}$, which can be undoped or doped with donors or acceptors and $La_{1-y}Sr_yFe_{1-x}Cr_xO_{3-z}$, which can be undoped or doped with niobium, magnesium, titanium or gallium, $Sr_{1-y-x}Ba_yLa_x Co_{1-b-c}Fe_bCr_cO_{3-z}$, which can be undoped or doped with e.g. donors or acceptors like niobium, magnesium, titanium or gallium, $Ba_{1-x}Sr_xTiO_{3-z}$, which can be undoped or doped with donors or acceptors such as manganese, iron, chromium or any other doping compounds and $PbZr_{1-x}Ti_xO_{3-z}$, which can be undoped or doped with donors or acceptors such as iron, niobium, lanthanum, chromium, or any other doping compounds. These kind of ceramic compounds exhibit a good flux of gas and furthermore have an excellent selectivity with respect to oxygen. In detail, if the upstream side of the membrane comprising this component is subjected to an overpressure of air, for example, it will let oxygen pass only. Thereby, it is possible to generate oxygen in a purity of up to 100%.

In a further preferred embodiment of the present invention, a cover layer is arranged on one or both sides of the substrate. With this regard, the cover layer or the cover layers may preferably be formed of silicon nitride or glass. This especially allows inhibiting reactions of components being present in the membrane with components being present in the substrate. In detail, a reaction of barium as suitable component of the membrane and silicon as suitable component of the substrate may be inhibited. Additionally, if provided at the side of the substrate being located opposite of the membrane, the cover layer may help forming or shaping, respectively, the pores of the substrate in the desired manner, thereby acting as a mask, for example. In particular, the cover layer or the cover layers can be dense or porous and can be applied by any deposition technique, for example thermal oxidation. A silicon nitride layer is applied by any deposition technique, for example chemical vapor deposition. A glass layer is for example a spin-on glass layer.

In a further preferred embodiment of the present invention, a barrier layer is provided between the membrane and the cover layer. This barrier layer preferably comprises a material chosen from the group comprising silicon oxide, titanium oxide, magnesium oxide, zirconium oxide, zirconium titanate, aluminium oxide and tantalum oxide, or any combination thereof. The barrier layer can be applied by any deposition method, for example reactive sputtering of oxides, or sputtering of metals followed by thermal oxidation, spin-on, or chemical vapor deposition. It may act as an intermediate layer between the cover layer and the membrane, if the materials of the membrane and the cover layer are formed from, may somehow interact with each other.

In a further preferred embodiment of the present invention, an air blower is provided upstream the membrane unit. This allows an improved gas stream to be conveyed to the electrode unit and thus to the membrane unit. The efficiency of the arrangement according to the invention may thus be improved.

In a further preferred embodiment of the present invention, a heating device, in particular a heat exchanger is provided upstream the membrane unit. A heating device enables to preheat the oxygen comprising gas, thereby reducing the amount of thermal energy which has to be inserted into the oxygen comprising gas by the plasma. By providing a heat exchanger, the latter may thereby use the heat of the gas being depleted with respect to oxygen and leaving the membrane unit after a separation cycle. The energy input being required for operating the arrangement according to the invention may thus be reduced.

In a further preferred embodiment of the present invention, a cooling device is provided downstream the membrane unit. This allows cooling the generated oxygen to a temperature range in which it may be used directly. With this regard, it is especially preferred possible to use the arrangement according to the invention on demand, or in situ, respectively. The cooling device may thereby be connected to a heat exchanger being provided upstream the plasma generation unit. This allows an especially cost-saving operation of the arrangement according to the invention.

The present invention furthermore relates to a method for separating oxygen from an oxygen containing gas, the method comprising the steps of: providing an arrangement according to the invention, the electrode unit being in fluid communication to an oxygen containing gas, rotating the at least one rotatable electrode wing, and applying a voltage to the electrode and to the at least one rotatable electrode wing to generate a plasma in the pores of the porous substrate. The method according to the invention provides the advantages like described with respect to the arrangement according to the invention.

In a preferred embodiment of the present invention, a power of $\geq 100$ W to $\leq 350$ W is used for generating the plasma. This power is enough to generate an efficient plasma inside the pores thereby being energy saving. This allows using the method according to the invention even in home care applications.

In a further preferred embodiment of the present invention, an oxygen flux of $\geq 1$ liter per minute is used. This flux is well usable and sufficient for most applications, like therapeutic applications, for example, and is furthermore well providable even in home care applications.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1:
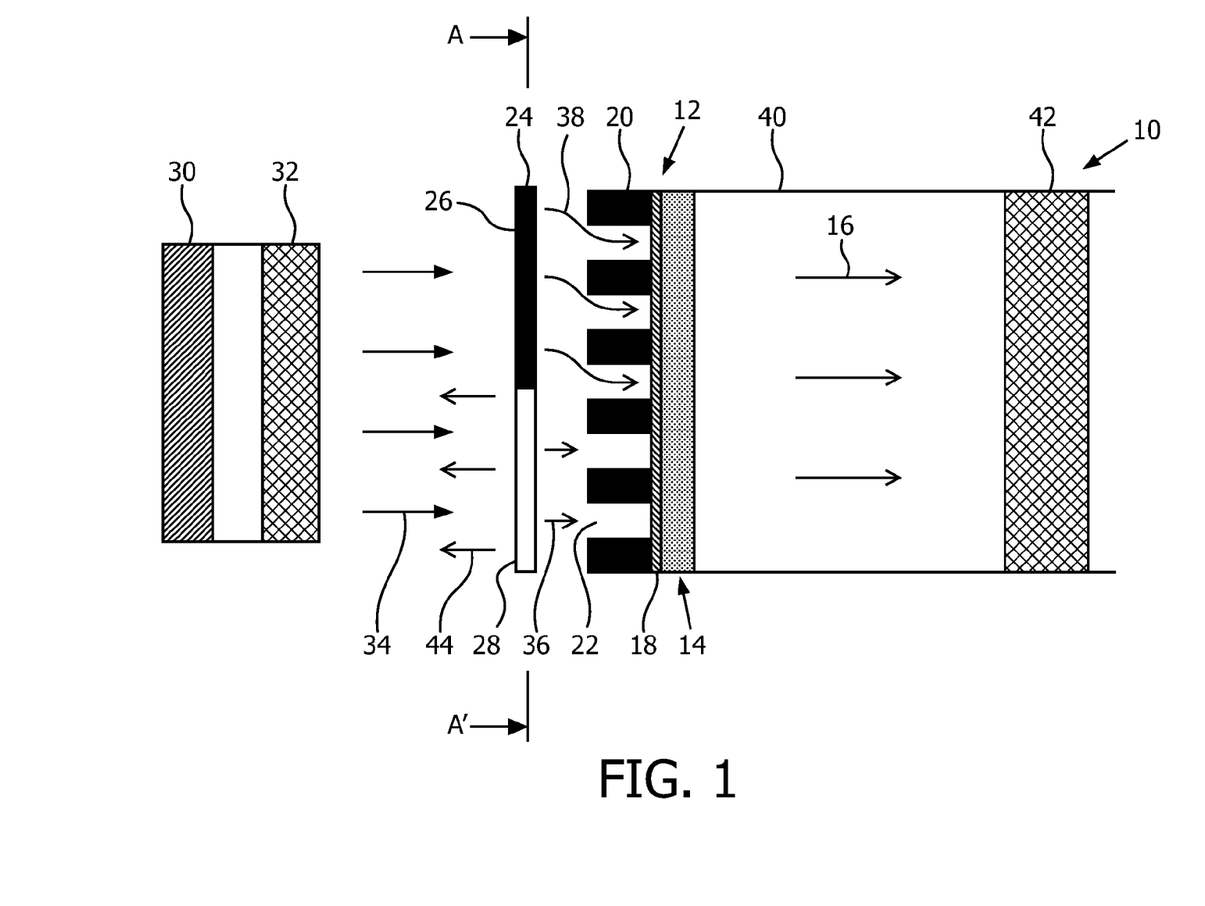
FIG. 1 shows a sectional side view of an arrangement according to the invention.

In FIG. 1, an arrangement 10 according to the invention is schematically shown. The arrangement 10 according to the invention is particularly suitable for separating oxygen from an oxygen containing gas. The arrangement 10 may thus be part of an oxygen separation device, or an oxygen concentrator, respectively. The arrangement 10 is very well suitable for oxygen therapy in home care applications, for example. However, the arrangement 10 is not limited to therapeutic applications, but is furthermore suitable for all kinds of generation of oxygen. As a further exemplary application, it is referred to the oxygen generation in airplanes.

The arrangement 10 according to the invention comprises a membrane unit 12. The membrane unit 12 comprises a membrane 14. The membrane 14 preferably is an oxygen separation membrane. In this case, its objective is to separate oxygen from the remaining constituents of an oxygen containing gas, and thus to provide a flow of oxygen, which advantageously is a flow of 100% pure oxygen. This is schematically shown by the arrows 16. Mostly, the main remaining constituent is nitrogen, especially in the case when air is used as oxygen containing gas. To get sufficient separation results, it is thus essential that the membrane 14 is very dense. A dense membrane 14 particularly is a membrane being selectively permeable with respect to oxygen, but being strictly or at least substantially non-permeable for other gases, especially for nitrogen.

The membrane 14 may either be a pure oxygen conducting membrane, or a mixed ionic-electronic conducting membrane. Generally, a force has to be applied to cause the oxygen being transferred through the membrane 14. This may be an electronic force. However, it is preferred, that the oxygen passes the membrane 14 due to a pressure difference between the feed side and the permeate side of the membrane 14, like will be apparent below.

The membrane unit 12 further comprises an electrode 18 being designed to be suitable for the generation of a plasma as will be apparent below. According to FIG. 1, the electrode 18 may be formed as an electrically conductive layer being arranged at the feed side of the membrane 14, or in other words at the upstream side of the membrane 14.

The membrane 14 is furthermore supported by a porous substrate 20. The porous substrate 20 comprises pores 22, which preferably are formed as continuous channels proceeding through the whole thickness of the substrate 20. A detailed discussion of the membrane unit 12 will follow below with respect to FIGS. 3 to 5.

The porous substrate 20 is directed towards an electrode unit 24. This electrode unit 24 is arranged in direct vicinity to the substrate 20. It is preferably disk-shaped and comprises at least one rotatable electrode wing 26 and an air gap 28 in the plane of the electrode wing 26. However, it is most preferred that the electrode 24 comprises a plurality of rotatable electrode wings 26 and air gaps 28 arranged there between.

It is preferred that the at least one electrode wing 26 is at least partially formed of platinum, palladium, iridium, or a metallic oxide, in particular $SrRuO_3$, or $SrRhO_3$, or alloys of the aforementioned compounds. These compounds are especially suitable for acting as an electrode in forming a plasma. Additionally, these compounds are stable in most oxygen containing gases even at elevated temperatures being generated by said plasma.

The at least one electrode wing 26 may thereby be electrically conductive by providing an electrically conductive layer on the surface of electrode wing 26. This may preferably be realized at a side being directed towards the membrane unit 12. The layer may thus comprise one of the aforementioned compounds. This allows the electrode wing 26 to be producible from any material which is suitable. The electrically conductive layer thereby provides the characteristic of an electrode. This allows the rotatable electrode wing 26 as such as well as the arrangement 10 according to the invention to be producible in a cost-saving manner. As an alternative the electrode wing 26 as such may be formed of said material. This allows an especially easy production of the electrode wing 26.

The distance between the surface of the rotatable electrode wing 26 and the substrate 20 should be less than the diameter of the pores 22 to have especially preferred conditions for igniting and maintaining a plasma. For this reason, additionally, the distance between the surface of the rotatable electrode wings 26 and the substrate 20 should be shorter than the length of the pores 22, e.g. as the thickness of the substrate 20. Additionally, the conductive surface of the wings 26 should be bigger than the surface of the respective air gaps 28.

Figure 2:
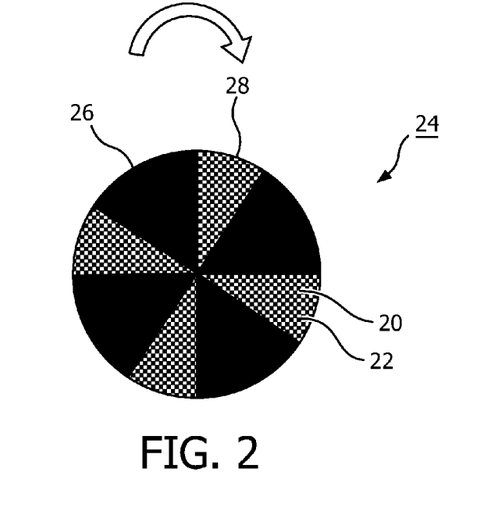
FIG. 2 shows a top view of a rotatable electrode in the plane A-A'.

A top view of the electrode unit 24 is shown in FIG. 2. According to FIG. 2, the electrode unit 24 comprises in a non limiting manner four electrode wings 26 and consequently four air gaps 28 arranged there between. Behind the air gaps 28 and thus behind the electrode unit 24, the porous substrate 20 can be seen together with the pores 22 arranged therein. Due to the fact the electrode wings 26 are rotatable, a region of the membrane unit 12 is covered by a wing 26 or open through an air gap 28 in an alternating manner.

The electrode wing 26, or the plurality of wings 26, respectively, is at least partially electrically conductive in particular at a side being directed towards the membrane unit 12. Therefore, the electrode wing or wings 26 may serve as electrodes for generating a plasma. In detail, together with the electrode 18 in the membrane unit 12, the rotatable electrode wing or wings 26 form a plurality of small plasma pumps.

The electrode unit 24 together with the electrode 18 in the membrane unit 12 has thus as main objective to generate a plasma there between, thereby heating and pressurizing the oxygen containing gas to separate oxygen from the latter. Referring back to FIG. 1, consequently, the arrangement 10 for separating oxygen may in a preferred and exemplary manner work as follows.

An oxygen containing gas, in particular air, is guided to the electrode unit 24. In order to transport the oxygen containing gas to the electrode 24, an air blower 30 may be provided upstream the electrode unit 24. The air blower 30 may increase the flow of oxygen containing gas to the electrode unit 24, or its feed side, respectively. Downstream the air blower 30, additionally, a heating device 32, in particular a heat exchanger may be provided. The heating device 32 improves the power efficiency of the arrangement 10 by pre-heating the oxygen comprising gas, e.g. air. The latter is then guided to the electrode unit 24. This is schematically shown by the arrows 34. An oxygen separation step may then be performed. To achieve an oxygen separation, the rotatable electrode wings 26 are rotating in front of the membrane unit 12, or the substrate 20, respectively. In the region of the air gaps 28, fresh air passes the electrode wings 26, or the electrode unit 24, respectively and is guided into the membrane unit 12 and into the pores 22, respectively, which is schematically shown by the arrows 36. At this stage, the gas may be present with an atmospheric pressure, i.e. approximately 1 bar.

In case the electrode wings 26 and the electrode 18 of the membrane unit 12 are connected to an electrical power source not shown as such, a plasma may be ignited and is burning between the wings 26 and the electrode 18 and thus inside the pores 20. This is schematically shown by the arrows 38. Generally, a rather small energy input for generating the plasma is sufficient. In detail, a power input of ≥100 W to ≤350 W may be sufficient depending on the temperature and membrane conditions to come up with oxygen flows on the permeate side of ≥1 l/min, especially in the order of a few liters per minute. This range of power input is very well suitable for home care applications. In general however, there are several modes of the plasma to be generated. In particular, it is possible to use DC plasma, ac plasma, RF plasma, pulsed plasma, or the like.

The provision of a plasma leads to an increased temperature. Due to the fact that the wings 26 as well as the air gaps 28 are rotating, the pores 22 filled with fresh air are closed and sealed against the surrounding air by the wings 26 during the plasma generation. The oxygen containing gas in the pores 22 of the membrane unit 12, or its substrate 20, respectively, is thus heated and pressurized. Exemplarily, the pressure may thus be increased up to a value of more than 1 bar, especially to 3 bar due to an increasing temperature of the gas up to a temperature of 900K caused by the plasma. Due to the overpressure, the oxygen containing gas is pressed against the membrane 14 resulting in oxygen being separated by flowing through the oxygen separating membrane 14 forming a flow 16 of substantially pure oxygen.

Due to the fact that the electrode wing or wings 26 are rotating, a wing 26 is subsequently followed by an air gap 28 in a next stage. Caused by the overpressure, which is still present in the pores 22 and the plasma which is burning further on for a short period of time when an air gap 28 is located in front of the respective pores 22, the gas being depleted with respect to oxygen moves out of the pores 22. This is schematically shown by the arrows 44. As the plasma will extinguish in case the wing 26 is no longer present in this region, the depleted gas will cool down which creates an under-pressure in the pores 22, especially a pressure of ≪1 bar, thus resulting in fresh air being blown into the pores 22. Subsequently, an additional cycle may start with the following wing 26, or the same wing 26 if only one wing is used. The electrode unit 24, or the rotating electrode wings 26, respectively, may thus act as a valve being responsible for holding air pressurized in the pores 22 as well as for realizing a gas exchange.

The start and the end of the plasma generation in the respective pores 22 is thus defined by the rotation of the electrode unit 24, or the at least one wing 26, respectively. However, recurrent ignition pulses may be added, if required. Generally, an electric field strength of ≥10 kV/cm should be used to (re-)ignite the plasma in the pores. In this case, the surface of the wing 26, or the plurality of wings 26, may be structured. In detail, an area of conducting material may be followed by an area of non-conducting material in the direction of rotation. Due to the size of the respective areas, the ignition pulses may be adjusted to the desired application. For example, an ignition voltage may be generated at a leading area, or stripe, respectively, whereas a plasma supply voltage may be generated in the remaining conductive surface.

According to the above, the electrode unit 24 functions as a gas pump. Although it works in different cycles due to the rotation of the electrode wings 26, it may generate a direct and continuous flow of oxygen containing gas due to a preferably high frequency of the working cycles. Together with the number of the wings 26 as well as their size, the rotation frequency may be adjusted to the required application. It may lie at approximately 100 Hz.

Swing processes are not necessary because nitrogen does not adsorb to the membrane 14, thereby not limiting the permeability conditions with respect to oxygen.

To collect the generated stream of oxygen, a tube 40 is connected to the membrane unit 12, or the membrane 14, respectively. It is of course preferred that the tube 40 is sealed in an air tight manner to allow guiding all of the generated oxygen to the desired application. A gas pump may furthermore be provided inside the tube 40 to guide the separated oxygen to the desired application. Additionally, downstream the membrane 14, a cooling device 42 may be provided for cooling the separated stream of oxygen. The cooling device 42 may be arranged in the tube 40, for example, or in fluid communication with the tube 40. Accordingly, the oxygen may be used directly in case the arrangement 10 is used in an in situ process in an especially preferred manner, or the oxygen may be stored in suitable containers. The temperature of the generated oxygen may be adjusted to a range being close to or exactly at the temperature which is required in the desired application, which may be a medical, or therapeutic, application, for example. The cooling device 42 preferably is connected to a heat exchanger as heating device 32 to further improve the efficiency of the arrangement 10 according to the invention.

All components may of course be sealed against ambient air and/or they may be connected to respective energy sources, where appropriate. Additionally, appropriate heat insulations may be provided where appropriate. For example, the electrode unit 24 together with the membrane unit 12 may be provided inside a casing for thermally insulating these components for an improved efficiency.

Figure 3:
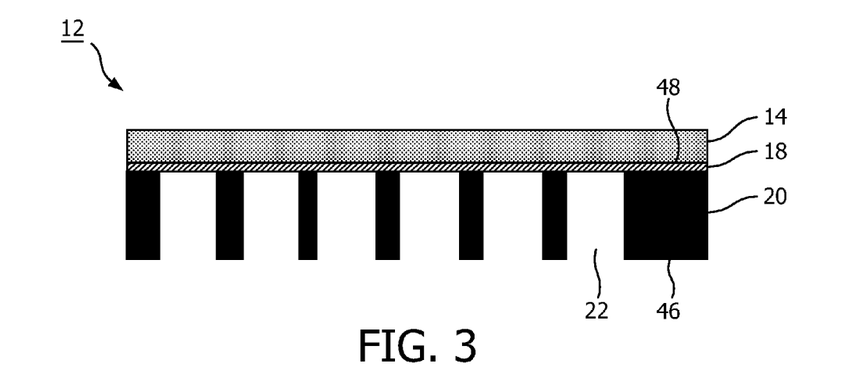
FIG. 3 shows one embodiment of a membrane unit.
Figure 4:
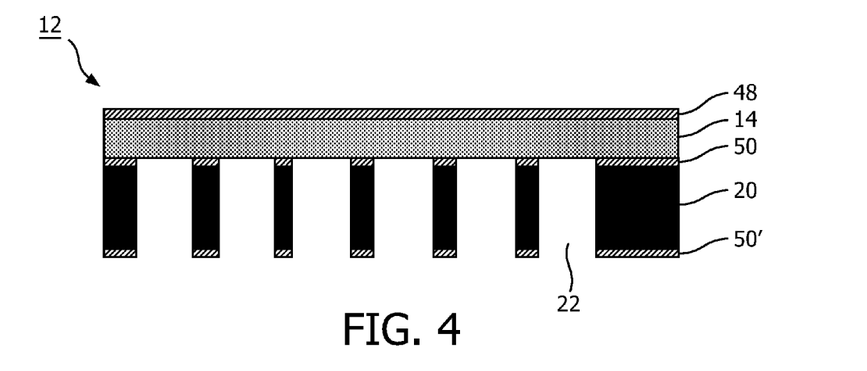
FIG. 4 shows a further embodiment of the membrane unit.
Figure 5:
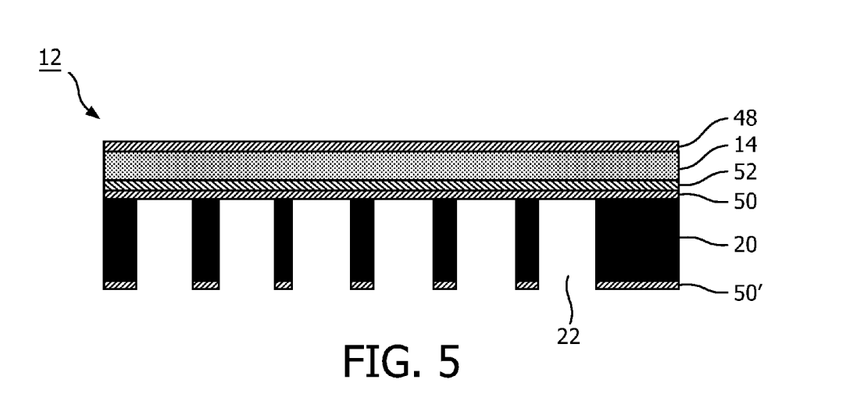
FIG. 5 shows a further embodiment of the membrane unit.

With respect to FIGS. 3 to 5, different embodiments of the membrane unit are described.

In FIG. 3, the membrane unit 12 is schematically shown. The membrane unit 12 contributes to the process of igniting and maintaining a plasma and is thus essential for the arrangement 10 according to the invention.

The membrane unit 12 according to FIG. 3 comprises a membrane 14 as one essential component. Like described above, in order to separate oxygen from an oxygen containing gas, the membrane 14 is dense. It is thus selectively permeable for oxygen.

To achieve these properties, the membrane 14 may be a solid ceramic membrane comprising selected inorganic oxide compounds. Preferable membranes 14 are based on a perovskite or fluorite crystal structure. As an example, the perovskite may be chosen from the group comprising $Sr_{1-y}Ba_y Co_{1-x}Fe_xO_{3-z}$, which can be undoped or doped with donors or acceptors and $La_{1-y}Sr_yFe_{1-x}Cr_xO_{3-x}$, which can be undoped or doped with niobium, magnesium, titanium or gallium, $Sr_{1-y-x} Ba_yLa_xCo_{1-b-c}Fe_bCr_cO_{3-z}$, which can be undoped or doped with e.g. donors or acceptors like niobium, magnesium, titanium or gallium, $Ba_{1-x}Sr_xTiO_{3-z}$, which can be undoped or doped with donors or acceptors such as manganese, iron, chromium or any other doping compounds and $PbZr_{1-x}Ti_x O_{3-z}$, which can be undoped or doped with donors or acceptors such as iron, niobium, lanthanum, chromium, or any other doping compounds. As a preferred example, the perovskite-related material $Ba_{0.5}Sr_{0.5}Co_{0.5}Fe_{0.2}O_{3-\delta}$ (BSCF) is very well suited. As an alternative, for example, a $Sr_{0.5}Ba_{0.5}Co_{0.8}Fe_{0.2}O_{3-x}$ thin film may be used.

It is a general property of these kinds of inorganic membranes 14 that they are completely impervious to all gases at room temperature, but allow oxygen molecules to pass through when heated to elevated temperatures. Mainly, temperatures above 700K are necessary to achieve a good oxygen flow with the requirement of only small sized membranes. For example, the above named BSCF may in an exemplary manner come up with an oxygen flow of 13 ml/cm$^2$min at 1275K, wherein a small membrane thickness is sufficient. Generally, it might be sufficient that the membrane 14 has a thickness in the range of 0.1 μm to 50 μm. This allows compact arrangements 10 to be formed and furthermore high gas flux through the membrane 14. Additionally, less heat is required for heating thin membranes.

The membrane 14 is supported by a porous substrate 20. The substrate 20 can for example be made of silicon, glass, quartz or aluminium oxide. However, any other substrate 20 such as also a metal substrate may be used. The substrate may have a thickness of ≥50 μm≤1 mm, in particular of ≥100 μm≤650 μm. This allows the substrate 20 to be stable but also compact allowing the arrangement 10 according to the invention to be used in portable homecare devices, for example. In the substrate 20, pores 22 may be formed. In detail, it is preferred that the substrate 20 comprises pillars 46 in which defined continuous channels as pores 22 for bringing a gas in controlled contact with the membrane 14 are provided in the substrate 20. This may be realized, for example, by etching, or sandblasting the substrate 20. Generally, micro-machining may be applied. The pillars 46 may preferably have a width of 50 μm to ≤1 mm, in particular of ≤200 μm to ≤800 μm to enable a sufficiently high stability with a good gas flow.

The substrate 20 preferably has a porosity of between 5% and 90%, in particular of between 20% and 80%. This allows a very high gas flux through the membrane unit 12. Additionally, the substrate 20 comprises still enough pillars 46 in a sufficiently large size to avoid the membrane unit 12 to be instable. Even if the porosity may thereby be formed by the well defined channels mainly, it is furthermore possible to provide a defined porosity inside the substrate 20 next to the defined channels, i.e. in the pillars 46. This might be formed by the porosity of the substrate material as such, or the porosity of the pillars 46, respectively.

Due to the fact that the channels are provided by a suitable process, they are well defined and allow a well defined and controlled contact of an air stream, for example, to the membrane 14. Well defined channels, or defined channels, respectively, shall thereby mean that the structure and the size of the channels is shaped according to the required demands. They may thus be arranged and adapted according to desired applications. In detail, they may have a width of ≥30 μm to ≤5 mm, in particular of ≥100 μm to ≤800 μm. However, it is most preferred that the channels, or the pores 22, respectively, have a diameter of ≥0.02 mm.

The arrangement 10 according to the invention is thus suitable to form an efficient oxygen generation system allowing high and well defined gas fluxes, and furthermore to achieve a stable system for handling even thin membranes 14.

In order to allow a plasma to be generated like described above, the membrane unit 12 comprises an electrode 18. According to FIG. 1 and FIG. 3, the electrode 18 is formed as a thin layer 48 arranged between the substrate 20 and the membrane 14. The electrode 18 may at least partially be formed of platinum, titanium, and iridium, or a metallic oxide, in particular iridium oxide, $SrRuO_3$, or $SrRhO_3$, or alloys of the aforementioned compounds. However, any other electrode is possible.

As an alternative, the substrate 20 may be directly connected to the membrane 14, whereas the layer 48 forming the electrode 18 may be arranged on the downstream side of the membrane 14, i.e. on the side opposite of the substrate 20.

Independent from the exact position of the layer 48 forming the electrode 18, it is important that the latter enables generating a plasma between the electrode 18 and the at least one rotatable electrode wing 26, but furthermore that it does not counteract the flow of oxygen through the membrane 14. Accordingly, if located between the substrate 20 and the membrane 14, it may be positioned only in the region of the pillars 46, or between the pillars 46 and the membrane 14, thereby being in contact with the pores 22. It will thus not hinder the oxygen flow through the membrane 14. If it is located adjacent to the membrane 14 over the whole surface, the layer 48 may preferably be porous to allow an unhindered oxygen flow through said layer 48. As an alternative arrangement, the layer 48 may provide holes to enable a gas flow. It may thus be designed as a sieve, for example.

The same holds for an arrangement of the layer 48 at the permeate side of the membrane 14. It mainly is preferred that the layer 48 is located over the whole surface. In this case, it may provide wholes, for example in the form of a sieve, or it may be porous and thus permeable for oxygen.

A further embodiment of the membrane unit 12 is shown in FIG. 4. According to FIG. 4, the membrane unit 12 further comprises a cover layer 50, 50' on one or both sides of the substrate 20. With this regard, the cover layer 50, 50' or the cover layers 50, 50' may preferably be formed of silicon nitride or glass. This especially allows inhibiting reactions of components being comprised in the membrane 14 with components being present in the substrate 20. In detail, a reaction of barium as suitable component of the membrane 14 and silicon as suitable component of the substrate 20 may be inhibited. Additionally, if provided at the side of the substrate 20 being located opposite to the membrane 14, the cover layer 50' may help forming or shaping, respectively, the pores 22, or the channels, respectively, in the desired manner, thereby acting as a mask, for example. In particular, the cover layer 50, 50' can be applied by any deposition technique, for example thermal oxidation. A silicon nitride layer is applied by any deposition technique, for example chemical vapor deposition. A glass layer is for example a spin-on glass layer. The thickness of the cover layer 50, 50' is preferably between 100 nm and 100 μm, especially between 100 nm and 10 μm.

Again, the layer 48 forming the electrode 18 may be arranged on the downstream side of the membrane 14, like shown in FIG. 4. However, the electrode layer 48 may as well be arranged on the upstream side of the membrane 14. It may in this case be arranged between the cover layer 50 and the membrane 14, or between the cover layer 50 and the substrate 20. In a further embodiment, a barrier layer such as titanium oxide can be applied between the cover layer 50 and the electrode 18.

Like stated above with respect to the layer 48, the latter as well as the cover layer 50 should not counteract the flow of oxygen. It should thus be porous or provide holes for allowing a suitable flow of oxygen through the membrane 14 if provided on the whole surface, i.e. in the pores 22.

A further embodiment of the membrane unit 12 is shown in FIG. 5. The embodiment according to FIG. 5 is comparable to the embodiment according to FIG. 4 However, according to FIG. 5, the membrane unit 12 further comprises a barrier layer 52 between the membrane 14 and the cover layer 50. This barrier layer 52 preferably comprises a material chosen from the group comprising silicon oxide, titanium oxide, magnesium oxide, zirconium oxide, zirconate titanate, aluminium oxide and tantalum oxide, or any combination thereof. The barrier layer 52 can be applied by any deposition method, for example reactive sputtering of oxides, sputtering of metals followed by thermal oxidation, or spin-on or chemical vapor deposition. It may act as an intermediate layer between the cover layer 50 and the membrane 14, if the materials the membrane 14 and the cover layer 50, respectively, are formed from, may somehow interact with each other. Again, the electrode layer 48 may be arranged both on the upstream side and on the downstream side of the membrane. Like stated above with respect to the layer 48, the latter as well as the barrier layer 52 should not counteract the flow of oxygen. It should thus be porous or provide holes for allowing a suitable flow of oxygen through the membrane 14 if provided on the whole surface, i.e. in the pores 22.

Additionally, in all embodiments shown, a further protection layer may be arranged on the membrane 14, or on the electrode layer 48, respectively. This protection layer may for example mechanically protect the membrane 14 and may thus improve the durability of the membrane 14 according to the invention. The protection layer preferably is formed as an inorganic, or an organic layer. Again, it preferably comprises holes or is formed porous thus allowing a suitable flow of oxygen through the membrane 4.

Furthermore, the respective layers, i.e. the electrode layer 48, the cover layer 50, 50' and/or the barrier layer 52 may be provided in the pillars 20, or in the pores 22, or channels, respectively, or both of it independent from each other. If provided in the pores 22, the oxygen flow should not be counteracted.

It has to be noted that all embodiments described with respect to FIGS. 3 to 5 may be used in the arrangement 10 according to the invention.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. Arrangement for separating oxygen from an oxygen containing gas, comprising:
    a membrane unit (12), and an electrode unit (24), wherein
    the membrane unit (12) comprises a porous substrate (20), a dense membrane (14) and at least one electrode (18), wherein
    the porous substrate (20) is directed towards the electrode unit (24), and wherein
    the electrode unit (24) comprises at least one electrode comprising at least one rotatable electrode wing (26) being at least partially electrically conductive.

2. Arrangement according to claim 1, wherein the pores (22) of the porous substrate (20) are formed of continuous channels.

3. Arrangement according to claim 1, wherein the pores (22) of the porous substrate (20) have a diameter of ≥0.02 mm.

4. Arrangement according to claim 1, wherein the electrode (18), of the membrane unit, is formed as an electrically conductive layer (48) being provided inside the pores (22) of the porous substrate (20).

5. Arrangement according to claim 1, wherein the membrane (14) is based on a material having a perovskite or fluorite crystal structure.

6. Arrangement according to claim 1, wherein a cover layer (50, 50') is arranged on one or both sides of the substrate (20).

7. Arrangement according to claim 6, wherein a barrier layer (52) is provided between the membrane (14) and the cover layer (50).

8. Arrangement according to claim 1, wherein an air blower (30) is provided upstream the membrane unit (12).

9. Arrangement according to claim 1, wherein a heating device (32) is provided upstream the membrane unit (12).

10. Arrangement according to claim 1, wherein a cooling device (42) is provided downstream the membrane unit (12).

11. Method for separating oxygen from an oxygen containing gas, the method comprising the steps of:
    providing an arrangement (10) according to claim 1, the electrode unit (24) being in fluid communication to an oxygen containing gas,
    rotating the at least one rotatable electrode wing (26), and
    applying a voltage to the electrode (18), of the membrane unit, and to the at least one rotatable electrode wing (26) to generate a plasma in the pores (22) of the porous substrate (20).

12. Method according to claim 11, wherein a power of ≥100 W to ≤350 W is used for generating the plasma.

13. Method according to claim 11, wherein an oxygen flux of ≥1 liter per minute is used.

\* \* \* \* \*